United States Patent [19]

Overmann et al.

[11] Patent Number: 5,233,525

[45] Date of Patent: Aug. 3, 1993

[54] ELECTRONIC CONTROL FOR TRANSMISSION GEAR SKIP SHIFT

[75] Inventors: Robert J. Overmann, Fargo; Jeffrey S. Milender, Jamestown; Calvin J. Kraning, Valley City, all of N. Dak.

[73] Assignee: Case Corporation, Racine, Wis.

[21] Appl. No.: 860,235

[22] Filed: Mar. 27, 1992

Related U.S. Application Data

[63] Continuation of Ser. No. 574,488, Aug. 28, 1990, abandoned.

[51] Int. Cl.$^5$ .............................................. B60K 41/06
[52] U.S. Cl. ..................................... 364/424.1; 74/866
[58] Field of Search ............... 364/424.1; 74/866, 856, 74/861

[56] References Cited

U.S. PATENT DOCUMENTS

| | | | |
|---|---|---|---|
| 4,425,620 | 1/1984 | Batcheller et al. | 364/424.1 |
| 4,527,447 | 7/1985 | Richards | 74/866 |
| 4,742,733 | 5/1988 | Schreiner | 74/866 |
| 4,799,158 | 1/1989 | Patil | 364/424.1 |
| 4,800,360 | 1/1989 | Dunkley et al. | 340/52 R |
| 4,838,125 | 6/1989 | Hamano et al. | 74/866 |
| 4,855,913 | 8/1989 | Brekkestran et al. | 364/424.1 |
| 4,870,581 | 9/1989 | Ito et al. | 364/424.1 |
| 4,874,070 | 10/1989 | Nellums et al. | 192/0.052 |
| 4,897,790 | 1/1990 | Bieber | 364/424.1 |
| 4,913,004 | 4/1990 | Panoushek et al. | 74/861 |
| 4,913,269 | 4/1990 | Dunkley et al. | 192/3.63 |
| 4,916,979 | 4/1990 | Irwin | 74/866 |
| 4,930,078 | 5/1990 | Dunkley et al. | 364/424.1 |
| 4,930,081 | 5/1990 | Dunkley et al. | 364/424.1 |

*Primary Examiner*—Thomas G. Black
*Assistant Examiner*—Collin W. Park
*Attorney, Agent, or Firm*—Jansson & Shupe, Ltd.

[57] ABSTRACT

An improved electronic control system for a vehicle transmission system having a plurality of sequential gear ratios allows the vehicle operator to selectively engage either a normal sequential gear ratio progression or a gear ratio progression that skips or omits certain low gear ratios from the gear ratio shift sequence. The transmission control system includes a microprocessor driven electronic control circuit that governs the transmission operation by selectively actuating, from a plurality of hydraulic clutch solenoid valves, a unique combination of solenoid valves for each gear ratio. Manually operable control means allows the vehicle operator to cause the microprocessor to select a software routine that omits certain solenoid valve combinations so as to progress through the transmission gear ratios during upshifts in the forward control mode at a faster rate, thus improving the acceleration of the vehicle in the low gear ratio range.

11 Claims, 9 Drawing Sheets

ELECTRONIC CONTROL FOR TRANSMISSION GEAR SKIP SHIFT

RELATED APPLICATION

This application is a continuation of application Ser. No. 07/574,488 filed on Aug. 28, 1990, and now abandoned.

BACKGROUND OF THE INVENTION

1. Field of the Invention

This invention relates to a vehicle transmission control system and more particularly to an electronic control system which is readily controllable by an operator in response to different operating conditions and which provides safe, efficient and reliable performance in each operating condition. The system of the invention is particularly advantageous for the control of transmissions of large off-road vehicles but has features usable in other applications.

2. Description of the Prior Art

The prior art contains many disclosures of electronic systems for the control of transmissions which transmit power between an engine and the vehicle traction means or other loads. For example, such systems have been the subject of several prior patents of the assignee of the present invention, including U.S. Pat. No. 4,425,620 to Batcheller et al., entitled "Electrical Control for Power Shift Transmission", and U.S. Pat. No. 4,855,913 to Brekkestran et al., entitled "Electronic Control System for Powershift Transmission", the disclosures of which are hereby incorporated by reference.

The systems of these prior patents are particularly designed for use in large off-road vehicles, such as those utilized in agricultural, construction and related applications and include a number of features which are particularly advantageous in such use. Such features include provisions for various modes of operation and the provision of a large number of forward and/or reverse gear ratios to permit an operator to obtain the ready and accurate control of movement of enormous loads without the overload of an engine and the clutches of a drive train. The operator may use an upshift/downshift control lever to request a speed change, accomplished by the system through the selection of an appropriate gear ratio, by the control of solenoid valves which hydraulically control the engagement of hydraulic clutches corresponding to an appropriate gear ratio. For example, the operator in a forward manual mode may operate the control lever to obtain a single gear ratio change to a next higher ratio, or by holding the lever may obtain sequential upshifts at predetermined time intervals, and may thereby readily obtain an optimum ratio as required by existing conditions.

SUMMARY OF THE INVENTION

This invention was evolved with the general object of providing improvements upon the prior art systems, particularly with respect to obtaining optimum performance under different operating conditions.

Important aspect of the invention relate to the recognition and discovery of problems with prior art arrangements and their causes and to an analysis of what is necessary to overcome such problems and otherwise provide an improved system. It is found that although the systems of the aforementioned Batcheller et al. and Brekkestran et al. patents are highly satisfactory for the normal off-road use in heavy load conditions for which they are designed, potential problems may arise which operate under other conditions. In particular, the rate of acceleration which is possible with the systems is limited and is less than would be desirable under certain conditions, such as when crossing highways or entering the stream of traffic on highways. It is further found that the rate of acceleration is limited in part by the fact that upshifts are performed by continuously and sequentially passing through all gear ratios which are intermediate a starting ratio, such as provided by a first or low gear, and a gear ratio appropriate for a load. Each upshift operation takes a certain length of time, typically 0.75 seconds for example, and the distances traversed in the lower ratios are relatively small. The result is that appreciable time may be consumed in crossing a highway or in accelerating to a speed high enough for highway operation.

In accordance with this invention, a system is provided which permits an operator to override the normal operation of the transmission control system and obtain a mode of operation better suited to existing conditions. The control system is readily incorporated in control systems such as disclosed in the aforementioned Batcheller et al. and Brekkestran et al. patents, and retains all of the advantageous features of such systems.

More particularly, an improved electronic control system is presented for use in a vehicle having an engine and a transmission with a plurality of gear ratios. The system allows the vehicle operator to selectively engage either a normal sequential gear ratio progression or a gear ratio progression that skips or omits certain low gear ratios from the gear ratio shift sequence. Thus, the vehicle may be accelerated at a faster rate to achieve greater vehicle performance in certain operating conditions. The electronic control system includes a microprocessor driven electronic control circuit that governs the operation of the transmission by the programmed activation of a plurality of hydraulic clutch solenoid valves, a manually operable control means for providing upshift and downshift electronic signals to the control circuit governing the vehicle transmission operation, and electronic gear selection control means for selecting between continuous sequential selection of the gear ratios corresponding to an uninterrupted progression of all gears ratios or for selecting an interrupted progression of said gears wherein only a portion of the gear ratios are used in accordance with a preferred order of progression.

In a preferred embodiment, the microprocessor driven electronic control circuit governing the operation of the transmission is analogous to the electronic control circuit disclosed in U.S. Pat. No. 4,425,620. The electronic control system described therein has been modified in accordance with this invention to accept an electronic signal from an electronic gear selection control means for selecting between continuous sequential selection of the gear ratios or an interrupted progression of said gears wherein certain of the low gear ratios are skipped or omitted from the sequence of gear ratios normally employed. Preferably, the electronic gear ratio sequence control means is a manually operable device integral with the manually operable gear shift control means for providing upshift and downshift electronic signals to the control circuit governing the vehicle transmission operation.

The electronic control system has been modified, upon receiving the electronic signal from the electronic gear selection control means, to employ alternative software instructions regarding the sequence of transmission hydraulic clutch solenoid actuation necessary to effect an actuation sequence of the solenoids so that certain of the low gear ratios are skipped or omitted from the sequence of gear ratios normally employed.

Accordingly, it is a specific objective of this invention to provide an electronic control system for selecting one of a plurality of electronic gear selection control programs for altering the sequence of operation of the transmission gear from continuous sequential selection of all of the gear ratios to only a portion of the gear ratios.

It is a further, specific objective of this invention that the selection of the electronic gear selection control program be achieved by use of a manually operable device that provides an electronic input signal to the electronic control system microprocessor.

It is a further objective of this invention that the manually operable device for selecting the electronic gear selection control program be provided on the manually operable control means for providing upshift and downshift electronic signals to the control circuit governing the vehicle transmission operation.

These and other objects, features and advantages of the invention will become more fully apparent in the following detailed description, taken in conjunction with the accompanying drawings.

DETAILED DESCRIPTION OF THE PREFERRED EMBODIMENTS

Figure 1:
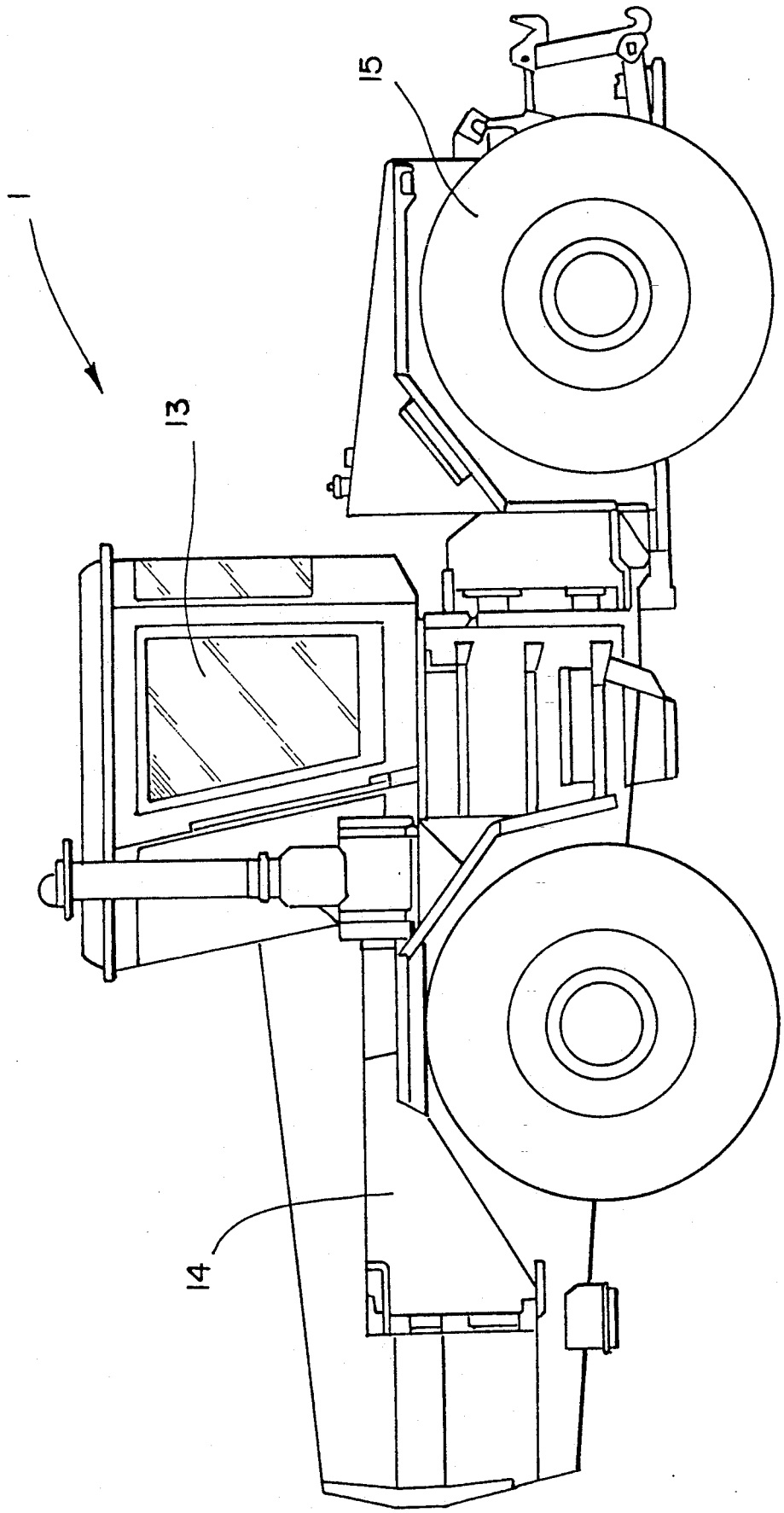
FIG. 1 is a side elevational view of a vehicle to which the present invention is suited for use.

Referring to the drawings, wherein reference characters designate like or corresponding parts throughout the views, FIG. 1 illustrates a vehicle 1, designed for off-road use, that is especially suited for application of the present invention. As is common in the art, the vehicle is provided with an engine 14, drive tires or traction means 15 and vehicle operator station 13.

Figure 2:
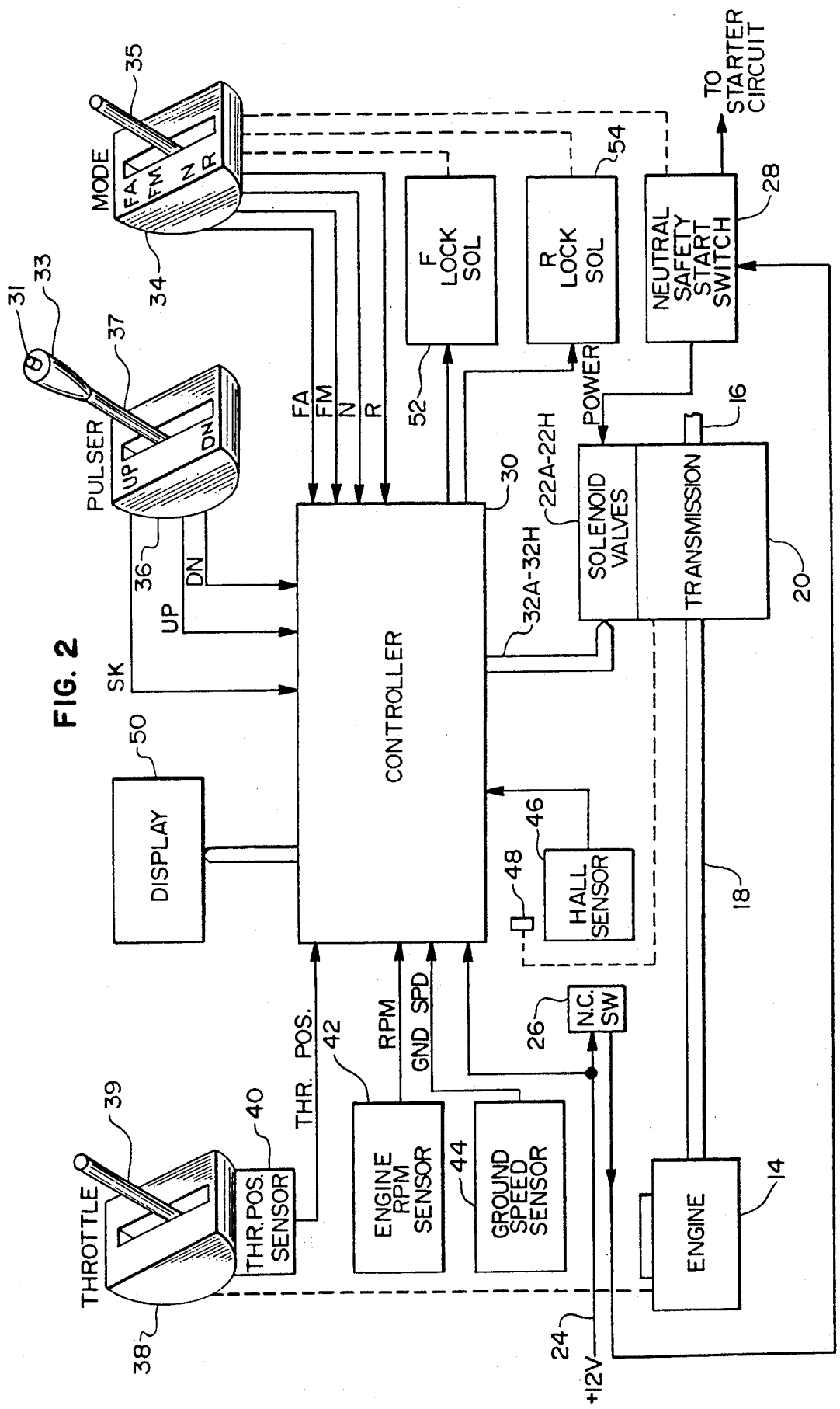
FIG. 2 is a block diagram illustrating the transmission control system of the present invention.
Figure 3:
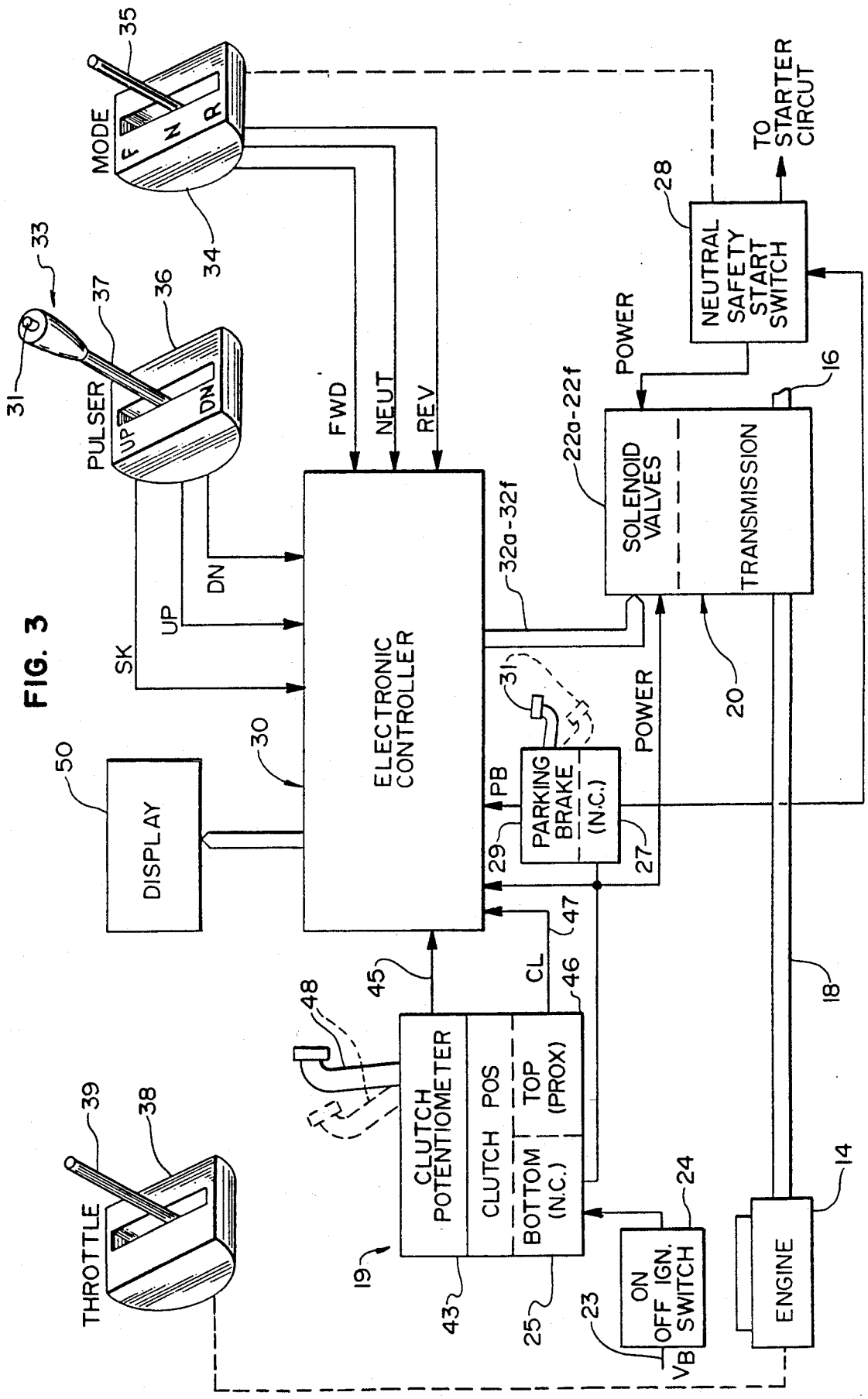
FIG. 3 is a block diagram illustrating an alternative embodiment of the transmission control system of the present invention.

Two alternative systems usable for control of the vehicle 1 of FIG. 1 are shown in the block diagrams of FIGS. 2 and 3. The system of FIG. 2 is similar to the system of the aforementioned Batcheller et al. U.S. Pat. No. 4,425,620 while the alternative system of FIG. 3 is similar to the system of the aforementioned Brekkestran et al. U.S. Pat. No. 4,855,913, the complete disclosures thereof being incorporated by reference. Both systems are compatible with and retain advantageous features of the systems of the prior patents.

The systems of both FIGS. 2 and 3 are operable for control of a vehicle having an engine and a transmission with a plurality of sequential gear ratios and both enable the operator of a vehicle to selectively use either a normal operating procedure to obtain normal sequential gear ratio progression suitable for off-road conditions, or a special operating procedure to obtain a gear ratio progression which skips or omits certain ratios from the normal progression. The special operating procedure may be used, for example, when a fast rate of acceleration is desired for safety or other reasons. With both systems, the operator can readily and quickly change to the special operating procedure, when desired, and both systems are such as to obtain easy, safe and reliable operation coupled with protection against overloads of vehicle drive train components. In the illustrated embodiments as hereinafter described, the normal and special operating procedures are obtained through programming of a microcomputer used for control of the transmission, but it will be understood that other equivalent means may be employed.

FIG. 2 diagrammatically illustrates a vehicle drive system which includes the engine 14 supplying power to an output drive shaft 16 through a drive train including a shaft 18 and a transmission 20. The transmission 20 is of a type which has a plurality of sequential gear ratios which are determined by the actuation of selected solenoid valves 22A–22H, or a combination thereof. In the preferred embodiment of the present invention, there are a total of eight solenoid valve 22A–22H, three of which must be actuated at any time to select a particular gear ratio. A total of twelve forward gear ratios, three reverse gear ratios, and neutral are provided by the actuation of unique combinations of three solenoid valves.

Electrical power to all of the solenoid valves 22A–22H is provided from a +12 V supply line 24, through a normally closed switch 26 and a neutral safety start switch 28. An electrical controller 30, comprising an aspect of the present invention, selects the gear ratio of the transmission 20 by selectively providing a ground connection through ground lines 32A–32H to the solenoid valves 22A–22H.

In accordance with important features of the invention, the vehicle operator may manually operate a control button 31 of a skip shift control 33. The operator may also control the mode of operation through a mode select control 34 manually operated by a control lever 35, while controlling up-down shifting operations through an upshift/downshift control 36 operated by a pulser lever 37 and while controlling the engine 14 through a throttle 38 operated by a throttle lever 39. In the embodiments shown in FIGS. 2 and 3, the skip shift control 33 is carried by the pulser lever 37, preferably at the distal end thereof, a preferred construction being shown in FIGS. 8 and 9.

The mode select lever 35 is selectively movable between a neutral (N) position, a reverse (R) position, a forward manual (FM) position and a forward automatic (FA) position to cause corresponding control signals to be supplied from the mode select control 34 to the controller 30. As diagrammatically indicated by dashed lines in FIG. 2, the mode select control 34 is also coupled to the neutral start switch 28 and operates to disconnect power from the solenoid valves 22A-22H. At the same time, the neutral safety start switch 28 provides the electrical power to the starter circuitry (not shown) for starting the engine 14. The mode select lever 35 and the neutral safety start switch 28, therefore, ensure that the transmission 20 is in neutral whenever the lever 35 is in the neutral position, regardless of the state of the ground lines 32A-32H.

The upshift/downshift control 36 is operated by the pulser lever 37 to provide upshift and downshift pulses to the controller 30. The pulser lever 37 is spring biased to an intermediate position at which neither upshift nor downshift pulses are provided. When the pulser lever 37 is moved forward, an upshift pulse is provided. If the vehicle operator maintains the lever 37 in the upshift position, further upshift pulses will be produced at predetermined time intervals until the lever 37 is released and returns to the intermediate position. Similarly, movement of the pulser lever 37 rearward produces one or more downshift pulses, depending upon how long the vehicle operator holds lever 37 in its rearward position. The upshift and downshift pulses from the upshift/downshift control 36 are used by the controller 30 to upshift or downshift the transmission 20 when the mode select lever 35 is in either the forward manual or reverse mode.

As aforementioned, the skip shift control 33 is preferably located at the distal end of the pulser lever 37. The button 31 is preferably a pressure sensitive button which is spring biased to the fully extended position, thereby ensuring that the skip shift control 33 is normally inoperative. When the button 31 is depressed by the vehicle operator, vehicle system voltage is provided to the controller 30 as the signal for the controller 30 to select an alternative electronic gear selection control program. The alternative program, either while the vehicle operator manipulates the pulser lever 37 for upshifting or downshifting in the FM mode or while the controller 30 manages shifting in the FA mode, alters the sequence of operation of the transmission gear ratios from continuous sequential selection of all of the gear ratios to only a portion of the gear ratios. Thus, for example, instead of shifting through gears 1-2-3-4-5-6-7-8-9-10-11-12 of a twelve speed transmission by pushing and holding the pulser lever 37 forward while in the FM mode, the transmission will be shifted from 1-4-6-8-9-10-11-12, omitting gears 2, 3, 5, and 7 from the sequence of engaged gears. Accordingly, vehicle acceleration will be enhanced. The skip shift button may be operated at any time. In this example of a twelve speed transmission, if it is depressed while in gear 6 and the pulser lever is moved forward, the transmission will be shifted directly to gear 8, omitting gear 7.

The throttle control 38 has a lever 39 which is mechanically linked to the engine 14 to control the speed of the engine 14. In addition, throttle position sensor 40 provides a throttle position signal to the controller 30.

In addition to the input signals received from the mode select control 34, the upshift/downshift control 36, the skip shift control 33, and the throttle control 38, controller 30 also receives input signals from engine RPM sensor 42, ground speed sensor 44, and Hall effect clutch position sensor 46. Clutch pedal 48 may be mechanically linked to the transmission 20 and thereby allow the vehicle operator to disengage the engine 14 from the transmission 20 and the drive shaft 16. The sensor 46 senses whenever the clutch pedal 48 is depressed from its normal position. In addition, when clutch pedal 48 is fully depressed, the clutch pedal 48 actuates the normally closed switch 26, thus breaking the supply of power from +12 V supply line 24 to solenoid the valves 22A-22H.

Alternatively, electronic clutch engagement switch control 19 may be combined with a spring-returned clutch pedal 48 in combination with a clutch pedal potentiometer 43 and proximity sensor or switch 46, as shown in FIG. 3. The sensor 46 detects the presence of the clutch pedal 48 at the top of its travel, when the pedal 48 is not depressed at all. An analog signal on line 45 is provided to the controller 30 by the potentiometer 43. A digital signal is provided on line 47 by the sensor 46 to controller 30 to indicate the sensed position of the pedal 48.

In the alternative embodiment, the electronic clutch engagement switch control 19 allows the vehicle operator to manually control the clutch engagement as in a conventional vehicle wherein the clutch pedal is mechanically linked to the transmission 20, as shown in FIG. 2. Control 19 permits the operator to feather the clutch and to disengage the engine from the transmission 20 and drive shaft 18. Sensor 46 senses whenever the clutch pedal 48 is depressed from its normal top position, and begins to feather the clutch by reducing the hydraulic pressure applied to the currently selected directional clutch. The reduction in hydraulic pressure is proportional to the relative position of the clutch pedal 48 as sensed by clutch potentiometer 43 and reflected in the analog value of signal 45. In addition, whenever the clutch pedal 48 is fully depressed, it actuates normally closed switch 25 located very near the end of the bottom of travel of the pedal 48, thus breaking the supply of power from the +12 power supply line 23 to the solenoid valves 22A-22H. One benefit of the manual clutch engagement control 19 is that the operator of a vehicle in the field can slow or stop the vehicle to proceed very slowly around an obstacle in the first forward gear (or first reverse gear) by use of the clutch pedal 48.

Returning to FIG. 2, in addition to controlling the state of ground lines 32A-32H, and thus the state of solenoid valves 22A-22H, the controller 30 also supplies output signals to the display 50. In the preferred embodiments, display 50 displays information of use to the vehicle operator, such as engine RPM, vehicle speed, the present gear selected by the controller 30, and (in the case of the forward automatic mode) the maximum gear selected by the vehicle operator.

The controller 30 may also provide signals to control the front and rear lockout solenoids 52 and 54. When a forward gear is selected and ground speed rises above a predetermined level (for example, one mile per hour), the controller 30 actuates the reverse lockout solenoid 54 to prevent the operator from moving the mode select lever 35 to the reverse (R) position. The controller 30 maintains the reverse lockout solenoid 54 in an actuated state until the ground speed, as indicated by the signal from the ground speed sensor 44, drops below one mile per hour. Similarly, the controller 30 actuates the forward lockout solenoid 52 when the mode select lever 35 is in the reverse (R) position and ground speed is above one mile per hour. In addition to the physical lockout feature provided by the forward and reverse lockout solenoids 52 and 54, the controller 30 also electronically inhibits a forward-to-reverse transition or a reverse-to-forward transition whenever ground speed is above one mile per hour. Alternatively, well known mechanical means manually actuated by the vehicle operator may be used to provide a lockout feature and thus eliminate the cost of the front and rear lockout solenoids 52 and 54. However, the automatic convenience of the lockout feature is not available with a purely mechanical device.

The operation of the systems of FIGS. 2 and 3 in the manual mode, without use of the skip shift feature, is generally as follows. The engine 14 is started with mode select lever 35 in the neutral (N) position. The neutral safety start switch 28 disconnects power to solenoid valves 22A-22H and provides power to the starter circuit. The transmission 20, therefore, is in neutral, since all of the solenoid valves 22A-22H are de-energized.

When the vehicle operator moves the mode select lever 35 from (N) to (FM), the controller 30 actuates the appropriate solenoid valves 22A-22H to provide the first forward gear. The clutch pedal 48 permits manual modulation of transmission 20 so the vehicle operator can feather the drive. Modulation by means of the clutch pedal 48 is only possible in the first forward gear, and the first reverse gear. The first reverse gear is obtained when mode select lever 35 is moved from N to R.

Gear ratios beyond the first forward gear ratio are obtainable by moving the pulser lever 37 to the upshift position. One movement of the pulser lever 37 to the upshift position provides a single upshift pulse. The controller 30 receives the upshift pulse and changes the combination of the actuated solenoid valves 22A-22H to produce a shift to the next higher gear. Holding the pulser lever 37 forward results in the production of a sequence of upshift pulses at predetermined time intervals. This results in a sequential upshift of the transmission 20 until the lever 37 is released or the highest gear is attained.

Pulsing or holding pulser lever 37 rearward in the downshift position imitates a similar downshift strategy. One or more downshift pulses are provided to the controller 30, which cause the controller 30 to change the combination of actuated solenoid valves 22A-22H to produce downshifting of the transmission 20. When the mode select lever 35 is in the (FM) position, the controller 30 permits the pulser lever 37 to upshift and downshift the transmission 20 between the first forward gear and the highest forward gear. The controller 30 does not permit downshifting from first forward gear to either neutral or reverse by means of the pulser lever 37. A shift from (FM) to either (N) or (R) can be achieved only by use of the mode select lever 35.

When the mode select lever 35 is placed in the (R) position, the controller 30 actuates the proper solenoids 22A-22H to provide the first reverse gear. Reverse gears with a higher ratio than the first reverse gear are obtained by pulsing or holding the pulser lever 37 as detailed above.

Gears above the first forward gear or below the first reverse gear cannot be directly modulated by the clutch pedal 48. Depressing clutch pedal 48, however, does cause the clutch position sensor 46 to send a signal to the controller 30. If the transmission 20 is not in the first forward or reverse gear, the controller 30 immediately de-energizes all solenoid valves 22A-22H. Thus, depressing the clutch pedal 48 shifts the transmission 20 to neutral. Further, depressing the clutch pedal 48 in any gear causes the controller 30 to compare engine RPM and ground speed and to select the appropriate gear ratio when the clutch pedal 48 is released.

If the vehicle is free-wheeling on a road when clutch 48 is depressed, the controller 30 de-energizes valves 22A-22H and the vehicle begins to coast. As the vehicle slows down with the clutch pedal 48 still depressed, the controller 30 continues to compare engine RPM and ground speed and continues to downshift electronically. When the clutch pedal 48 is finally released, the controller 30 energizes the appropriate combination of solenoids 22A-22H for the gear ratio most closely matching engine RPM and ground speed requirements. The controller 30 also preferably updates the gear ratio display on the display 50, allowing the vehicle operator to confirm that a lower gear will be selected as soon as the clutch pedal 48 is released.

Another common situation is when the vehicle is in the field pulling an object. In this case, as soon as the vehicle operator depresses the clutch pedal 48, the vehicle will stop due to the drag of the object. When clutch pedal 48 is released, the controller 30 actuates the appropriate combination of solenoid valves 22A-22H to provide the first forward gear. This is desirable since the first forward gear can be modulated by using the clutch pedal 48. This feature is particularly advantageous in permitting the vehicle operator to stop the vehicle immediately upon observing an obstacle and to move the vehicle slowly around the obstacle by the use of the clutch pedal 48.

The transmission control systems of FIGS. 2 and 3 also provide operation in a forward automatic mode. In this mode, the controller 30 controls the gear ratio of transmission 20 as a function of engine RPM, throttle position, and a maximum forward gear selected by the vehicle operator.

To select the maximum forward gear in the forward automatic mode, the driver first places the mode select lever 35 in the forward manual (FM) position. The controller 30 controls the solenoid valves 22A-22H to provided the first forward gear. The operator then pulses or holds the pulser lever 37 forward to upshift the transmission 20 until the maximum desired gear ratio is reached. The operator then moves the mode select lever 35 from the (FM) to the (FA) position. While the select lever 35 is in the (FA) position, the controller 30 shifts automatically to any gear ratio from the maximum gear setting down to the first forward gear. Gear shifts above the maximum gear ratio or below the first forward gear are not permitted.

In the forward automatic mode, the controller 30 receives the throttle position signal from the throttle position sensor 40 and the RPM signal from engine RPM sensor 42. Controller 30 has a stored table indicating the engine RPM which corresponds to the particular throttle position when the vehicle is in an unloaded state. In the event that engine RPM begins to lag behind the throttle setting, the controller 30 shifts the transmission 20 until the measured engine RPM increases to match the throttle set point. This comparison of throttle set point and engine RPM is performed continually by the controller 30, and the transmission 20 is upshifted and downshifted between the first forward gear and the maximum gear set by the vehicle operator in order to maintain the desired relationship between the engine RPM and the throttle position set point.

Throughout this process, it is preferred that the display 50 display both the maximum gear setting and the actual gear selected by the controller 30 when the transmission control system is in the forward automatic mode. This permits the vehicle operator to compare at any time the maximum gear which has been set and the current gear.

The operation of the systems of FIGS. 2 and 3 in the manual and automatic forward mode, when the skip shift control 33 is engaged, is generally as outlined above. However, with the skip shift control 33 activated, the controller 30 does not cause the solenoid valves 22A-22H to become activated in the sequence that would result in the normal sequential upshift of transmission 20.

In the FM mode, pulsing or holding the pulser lever 37 in the upshift position still results in the controller 30 receiving the upshift pulse so as to actuate the appropriate combination of solenoid valves 22A-22H. With the skip shift control 33 engaged, the controller 30 energizes particular solenoids 22A-22H so that the selected gear matches an alternative shift sequence schedule that omits certain "low" gears. In the preferred embodiment, instead of shifting from first gear to high gear through gears 1-2-3-4-5-6-7-8-9-10-11-12 by pushing and holding the pulser lever 37 forward without the skip shift control 33 engaged, the transmission will be shifted from 1-4-6-8-9-10-11-12, omitting gears 2, 3, 5, and 7 from the sequence of engaged gears. For example, if the skip shift control 33 is engaged while the vehicle is in gear 2 or 3, the next gear selected by the controller 30 will be gear 4. Additionally, if the vehicle is in gear 4 with the skip shift control 33 and the pulser lever 37 engaged, the next gear selected by controller 30 will be gear 6. Likewise, when the skip shift control 33 and the pulser lever 37 are engaged while the vehicle is in gear 6, the next gear selected will be gear 8. Subsequent upshifts from gear 8 will follow the normal sequential progression until the highest gear is reached, regardless of the engagement of the skip shift control 33.

In the FA mode, both with the maximum gear ratio set or allowing the controller 30 to select from the entire range of forward gear ratios, it is also possible to arrange the system so that engaging the skip shift control 33 causes the controller 30 to operate similarly to the FM mode regarding the sequence of gear ratios selected. The controller 30, based on the input from the throttle position sensor 40 and the engine RPM sensor 42, energizes those solenoids 22A-22H that match the alternative shift sequence schedule. By omitting certain "low" gears (in the preferred embodiment, gear ratios 2, 3, 5, and 7), the controller 30 rapidly passes through the "lower" gear ratios and more fully utilizes the power band of the engine 14 at higher engine RPM to more quickly accelerate the vehicle.

In the preferred embodiment, the skip shift control 33 is operative, even with the pressure sensitive button 31 depressed to engage the skip shift control 33, only in the FM mode and only for upshifting transmission 20. For reasons of cost and perceived customer preferences, the skip shift control 33 is inoperative in the FA and R modes and will not allow the vehicle operator or the controller 30 to downshift according to a gear ratio sequence omitting certain gear ratios.

Controller 30

Figure 4:
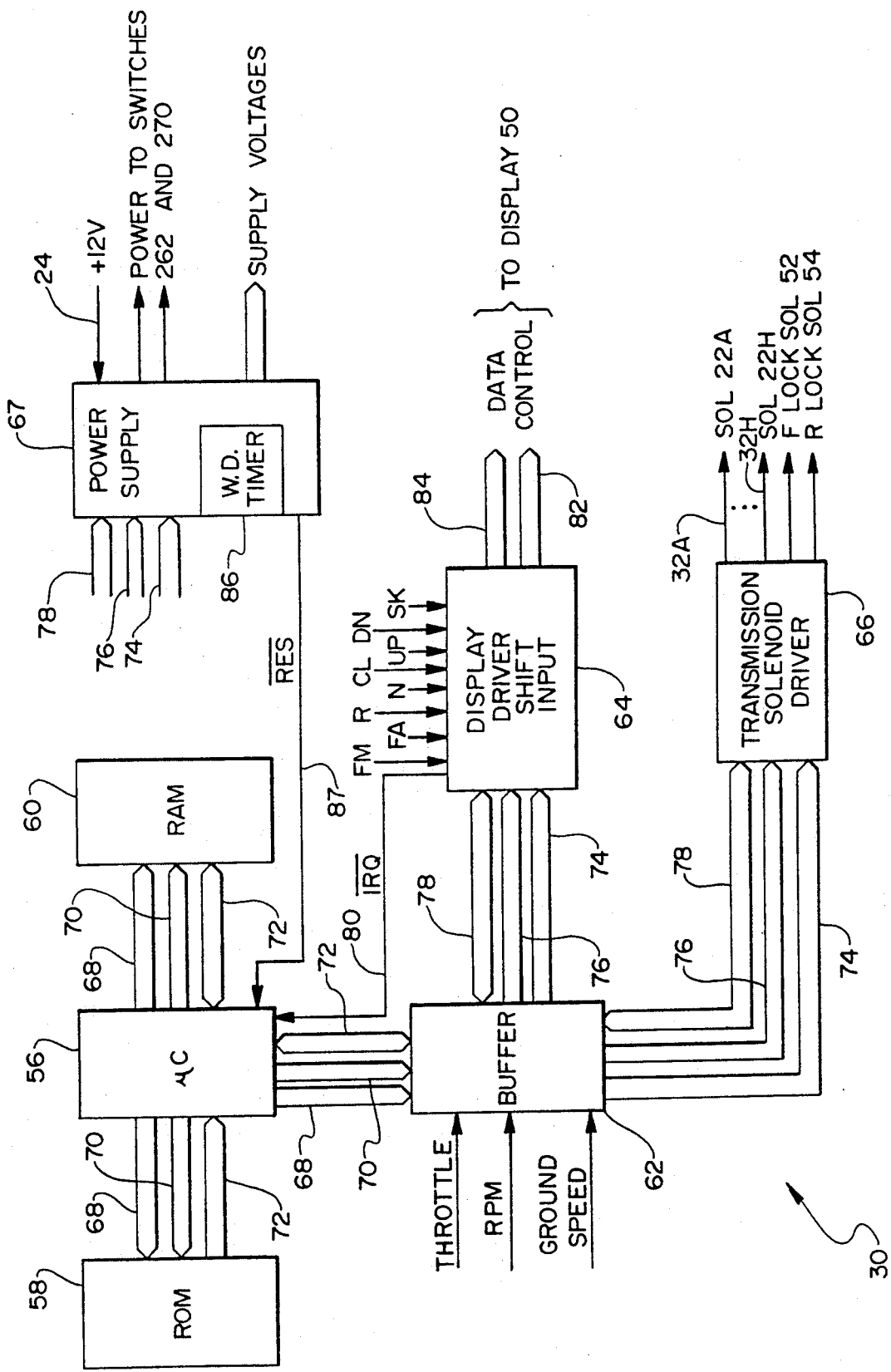
FIG. 4 is an electrical block diagram illustrating, in further detail, a portion of the transmission controller shown in FIG. 2.

FIG. 4 is a block diagram of the controller 30 shown in the embodiment of FIG. 2. The controller 30 includes microcomputer 56, read only memory (ROM) 58, random access memory (RAM) 60, buffer circuitry 62, display driver/shift input circuit 64, transmission solenoid driver circuit 66, and power supply circuit 67.

Microcomputer 56 is in communication with and controls ROM 58, RAM 60, and buffer 62 through control lines 68, address bus 70, and data bus 72. Buffer 62 receives throttle position, RPM and ground speed input signals, as well as data from the display driver/shaft input circuit 64 and the transmission solenoid driver 66. Buffer 62 controls and communicates with display driver shift input circuit 64 through the control lines 74, address bus 76, and data bus 78. In addition, the display driver shift input circuit 64 provides signals indicating that the position of mode select lever 35, pulser lever 37, skip shift control 33 or clutch pedal 48 has changed. The display driver/shift input circuit 64 also provides an interrupt signal (IRQ) to microcomputer 56 on interrupt line 80.

Preferably, the throttle position, RPM, and ground speed signals from the sensors 40, 42, and 43, respectively, are initially received by signal processing circuitry (not shown) within the power supply circuit 67. The signals are processed, converted to digital signals, and handed off to the buffer 62. The throttle position signal from the sensor 46 is an analog signal which is converted by an analog-to digital converter with in the power supply circuit 67. The RPM and ground speed signals from the sensors 42 and 43 area pulse signal of varying frequency. They are processed by a programmable timer module (PTM) within the power supply circuit 67. After processing, all signals are presented to the buffer 62 for manipulation by microcomputer 56.

The display driver/shift input circuit 64 provides control signals to the display 50 by means of control lines 82 and data bus 84. In addition, in one embodiment, display driver shift input circuit 64 receives input signals from the mode select control 34, upshift/downshift control 36, skip shift control 33, and clutch position sensor 46. The signals from the mode select control 34 are labeled "FM", "FA", "R", and "N", and indicate the mode selected by mode select lever 35. The signals from the upshift/downshift control 36 are labeled "UP" and "DN", and indicate an upshift or downshift as desired by the vehicle operator. The signal from the skip shift control 33 is labeled "SK", and indicates the selection of the vehicle operator to engage the skip shift algorithm. The signal from the clutch position sensor 46 indicates the position of the clutch pedal 48, and is labeled "CL" in FIG. 4. The microcomputer 56 interrogates the status of these input signal through the buffer 62.

The transmission solenoid driver circuit 66 receives signals from the buffer 62 on control lines 74, address bus 76, and data bus 78. The outputs of the transmission the solenoid driver 66 provide grounds for solenoid valves 22A-22H. Preferably, eight individual solenoid valves 22A-22H are provided, such that the transmission solenoid driver 66 provides an individual ground line 32A-32H to each of the eight solenoids 22A-22H, respectively. Three solenoids must be energized by a ground connection in order to select a gear of the transmission 20.

The transmission solenoid driver 66 also provides grounds for the front lock solenoid 52 and rear lock solenoid 54. The grounds to energize solenoids 52 and 54 are also controlled by the microcomputer 56 through buffer 62.

The transmission solenoid driver circuit 66 provides feedback signals to the microcomputer 56 which indicate that the individual solenoids 22A-22H and their associated transmission solenoid driver circuits are functioning properly. The microcomputer 56 can check and interrogate the individual solenoid driver circuits by supplying address signals from the buffer 62 to the transmission solenoid driver circuit 66 on address line 76, providing control signals on control line 74 and monitoring the feedback signals from the transmission solenoid driver circuit 66 via the data bus 78 and the buffer 62.

The power supply circuit 67 receives the +12 V input power from line 24 and provides the necessary supply voltages for the electronic circuitry of the controller 30. The power supply circuit 67 preferably includes watchdog timer 86, which prevents software excursions by the microcomputer 56. Communication between the microcomputer 56 and the power supply circuit 67 is provided by the buffer 62, control lines 74, address bus 76, data bus 78 and reset (RES) line 87.

Display Driver/Shift Input Circuit 64

Figure 5:
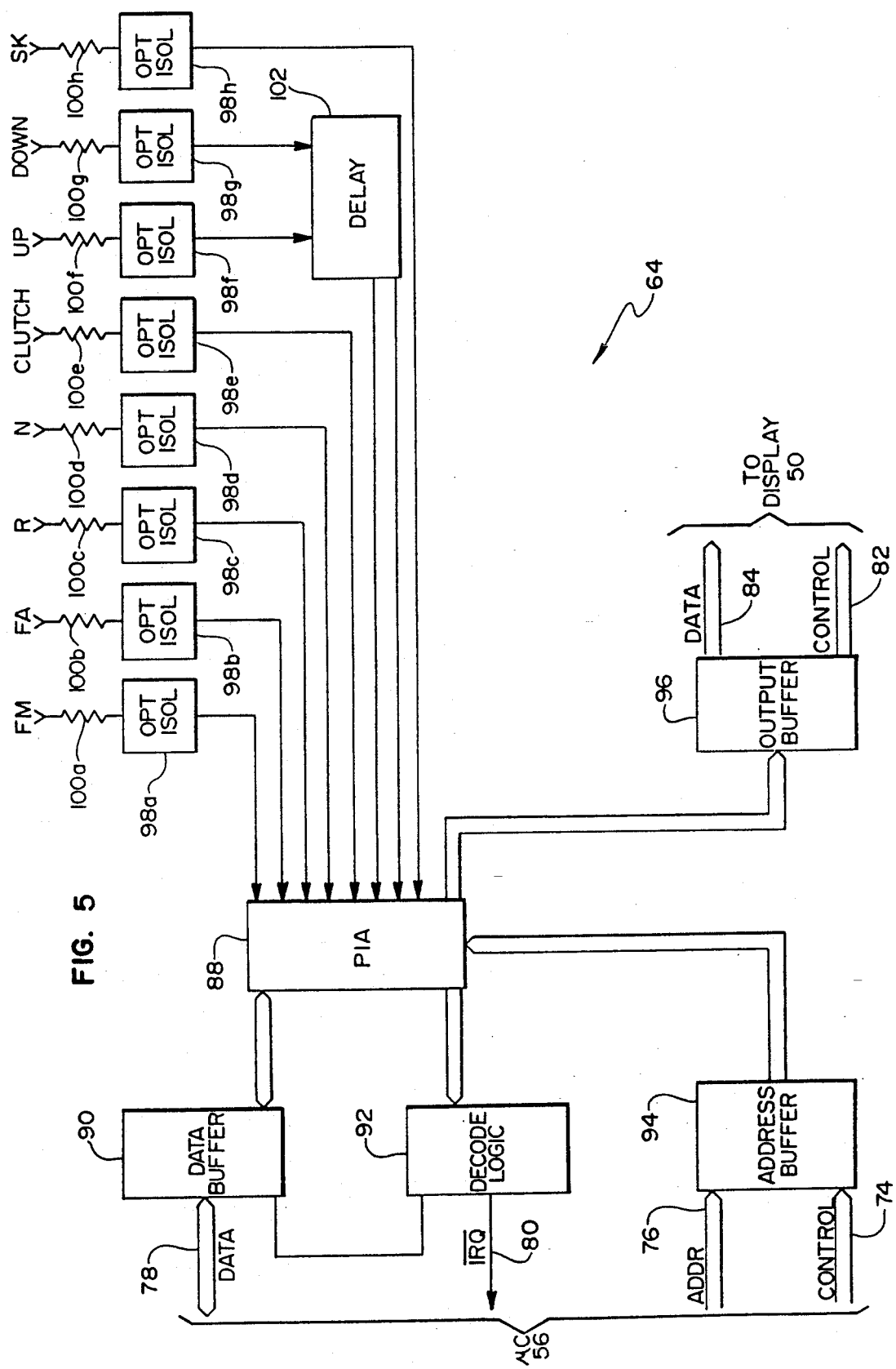
FIG. 5 is an electrical block diagram of display driver shift impact circuit shown in FIG. 4.

FIG. 5 is an electrical block diagram of the embodiment of display driver/shift input circuit 64 shown on FIG. 4. As seen in FIG. 5, circuit 64 includes peripheral interface adapter (PIA) 88, data buffer 90, decode logic 92, address buffer 94, output buffer 96, optical isolators 98a-98h, input buffer 100a-100h, and delay circuit 102.

The microcomputer 56 communicates with the PIA 88 through data buffer 90, decode logic 92 and address buffer 94. The microcomputer 56 provides address and control information on address bus 76 and control lines 74 by means of buffer 62 shown in FIG. 4. Data to be displayed by the display 50 is supplied on the data bus 78 through the data buffer 90, PIA 88 and output buffer 96 to the display 50. Input signals from the mode select lever 35, pulser lever 37, skip shift control 33, and clutch position sensor 46 are supplied to the PIA 88 and are in turn supplied to the buffer 62 by data line 78. The interrupt (IRQ) line 80 indicates to microcomputer 56 that a change in the status of an input signal has occurred and that the microcomputer 56 should interrogate PIA 88 to determine the present status of the input.

The FM, FA, and R signals from the mode select control 34 are produced by Hall effect sensors, and are in the form of a current signal which is present as long as the lever 35 is in that particular position. The N signal is preferably produced by a mechanical switch, which may be a part of the neutral safety start switch 28, and is also a current signal which is present when the lever 35 is in the neutral (N) position.

The FM, FA, R and N signals are supplied through resistor 100a-100d to optical isolators 98a-98d, respectively. At any time, only one of the four input current signals should be present. The outputs of optical isolator 98a-98d are normally high, and one of the outputs changes to a low state when the signal current is present. Thus, the four inputs to the PIA 88 from optical isolators 98a-98d should include three high signals and one low signal, the low signal corresponding to the particular position of the mode select lever 34.

The signal from the clutch position sensor 46 is a current signal which indicates whether the clutch pedal 48 is in its normal position or whether it has been depressed by the vehicle operator. The clutch signal is supplied through resistor 100e to optical isolator 98e. The output of optical isolator 98e is supplied to an edge sensitive input of the PIA 88.

The output of optical isolator 98d is also supplied to an edge sensitive input of the PIA 88. As a result, any change of the outputs of optical isolators 98d or 98e which indicates that the vehicle operator has moved the lever 35 to the neutral (N) position or has depressed the clutch 48 results in an immediate signal to the microcomputer 56 by means of the interrupt (IRQ) line 80. This interrupt is provided because the vehicle operator expects that actuation of the clutch pedal 48 or movement of the lever 35 to neutral will result in immediate action. This immediate action is achieved by providing an interrupt signal to microcomputer 56 upon a change in state from high to low of the outputs of either optical isolator 98d or optical isolator 98e.

The upshift/downshift control 36 includes a pair Reed switches, or alternatively, Hall sensors, for providing the UP and DN signals. As long as the lever 37 is held in the upshift position, a signal current is supplied through resister 100f to optical isolator 98f. Similarly, as long as the lever 37 is held in the downshift position, a signal current is supplied through resistor 100g to optical isolator 98g.

The outputs of optical isolator 98f and 98g are supplied to the delay circuit 102. The delay circuit 102 acts as a hardware timer to establish a time period in which the pulser lever 37 must continue to be held in the up or downshift position in order to produce another pulse. In a preferred embodiment, the delay circuit 102 supplies input signals to edge sensitive inputs of the PIA 88. When the lever 36 is first moved to the upshift position, the output of the optical isolator 98f changes, and the delay circuit 102 provides a signal to the PIA 88 which indicates a change in the upshift input signal. The PIA 88 senses this signal transition, determines which input line has changed state, stores that information, and provides an interrupt to the microcomputer 56. If the lever 37 continues to be held in the upshift position for a predetermined time period (which in one preferred embodiment is about 728 milliseconds), the delay circuit 102 provides another signal transition on the upshift input line to the PIA 88. This results in the PIA 88 again determining which line has changed state, storing that information, and providing an interrupt to the microcomputer 56. This process will continue as long as the pulser lever 37 remains in the upshift position.

Similarly, the movement of the pulser lever 37 to the downshift position causes current to be supplied through resistor 100g to optical isolator 98g. The delay circuit 102 supplies a downshift input signal to the PIA 88 which changes state in response to this change in the output of the optical isolator 98g. The PIA 88 detects the change in the downshift signal, stores this information and supplies an interrupt to the microcomputer 56. If the downshift current input remains unchanged for longer than the predetermined time period, the delay circuit 102 again supplies a change in the downshift signal to the PIA 88, which results in another interrupt to the microcomputer 56.

The signal from the skip shift control 33 is also a current signal which indicates whether the skip shift pressure sensitive button 31 is in the normal or depressed position. The skip shift signal is supplied through resistor 100h to optical isolator 98h. The output of optical isolator 98h is further supplied to a level sensitive input of PIA 88.

Figure 6:
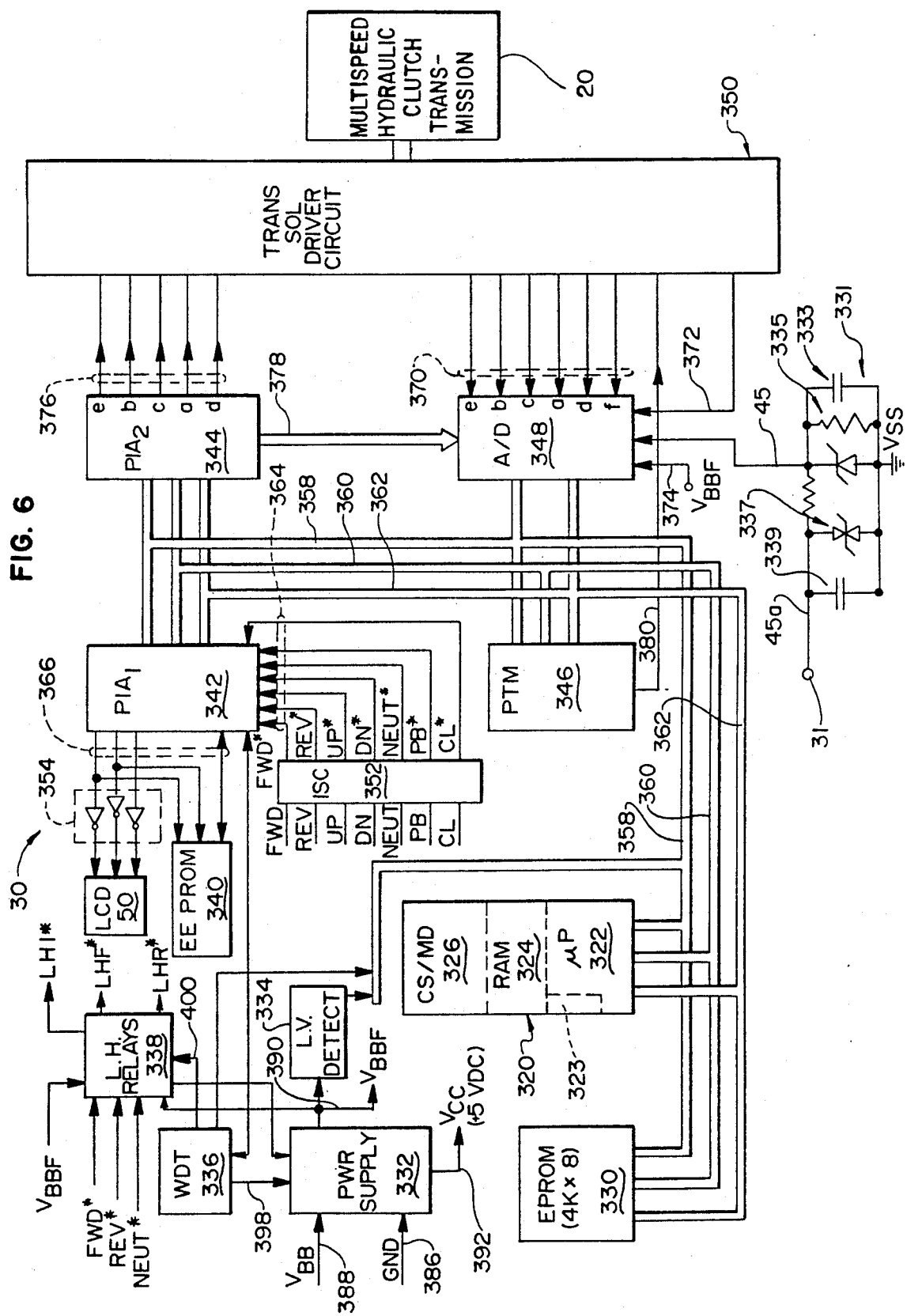
FIG. 6 is an electrical block diagram of a portion of the transmission controller shown in the alternative embodiment shown in FIG. 3.

Alternatively, the skip shift control 33 input can be processed according to the electronic controller 30 shown in the embodiment seen in FIG. 3 and corresponding to a system disclosed by U.S. Pat. No. 4,855,913 to Brekkestran et al., entitled "Electronic Control System for Powershift Transmission". Using the characters therein assigned to the various features and by reference incorporating the description of the controller 30 hereby, as seen in FIG. 6, the controller 30 includes the microcomputer 320 which is comprised of microprocessor 322 with crystal oscillator time base 323, random access memory (RAM) 324, and a chip select/memory decode (CS/MD) circuit 326. The controller 30 also includes: a U-V erasable, programmable read-only memory (EPROM) 330; a power supply circuit 332; a low voltage detector circuit 334; a watchdog timer circuit 336; a limp-home relay circuit 338; a nonvolatile read/write (R/W) memory 340 in the form of an electrically erasable, programmable read-only memory (EEPROM); first and second buffered input/output (I/O) port circuit 342 and 344 which may take the form of a PIA; a programmable time module (PTM) 346; an analog-to-digital (A/D) converter circuit 348; a transmission solenoid driver circuit 350; an input signal conditioner circuit 352; a skip shaft control circuit 331; and a display driver circuit 354.

Microprocessor 322 communicates with the remainder of the circuits and modules through multiple-line control bus 358, multiple-line address bus 360 and multiple-line bus 362, which are connected as shown. The input conditioner 352 receives input signals FWD, NEUT and REV from the mode select control 34, receives UP and DN input signals from the pulser select control 36, receives input signal PB from parking brake control 27, and receives input signal CL from the manual clutch engagement control 26. These signals are transformed by conditioning circuit 352 into negative true digital logic signal FWD*, REV*, UP*, DN*, NEUT*, PB*, and CL* for delivery to first I/O port 342 through lines 364, as shown. I/O port 342 controls and communicates with the display driver circuit 354 through the control lines 366. In addition, port 342 communicates serially with and controls nonvolatile R/W module 340 via the control lines 366.

The skip shift control circuit 331 provides an analog input signal to A/D converter 348 which represents the position of the pressure sensitive button 31 on line 45. The A/D convertor 348 is a sixteen-channel analog-to-digital input device. It receives the signal on line 45 as an analog input. The converter 348 also receives analog input signals from feedback lines 370 from the transmission solenoid driver circuit 350. The converter 348 also receives the filtered supply voltage signal Vbbf as an analog input from line 374. Each of these analog input signals is connected by a distinct input pin leading to a distinct channel of the A/D converter 348. The A/D converter 348 digitizes the analog signal of lines 45, 370 and 374 for deliver via data bus 362 to microprocessor 322 for analysis.

The second I/0 port 344 provides digital output signals to output lines 376 which lead to the inputs of the solenoid drivers of circuit 350. The module 344 also outputs control signals for the channel selection of the A/D converter 348 via multiple control lines 378.

The microprocessor 322 in a conventional manner periodically interrogates all of the inputs to determine their status, and periodically updates all outputs. This communication function occurs over buses 358 through 362. Selected inputs, such as UP* and DN*, are connected by lines 364 to the input/output port 342 in a conventional manner which allows an interrupt signal (IRQ) to the microprocessor 322 via an interrupt line which is part of control bus 358. These interrupts are generated by port 342 upon a change of state of any of the lines 364 from high to low.

The transmission solenoid driver circuit 350 provides feedback signals on lines 370 to the A/D converter 348 which are digitized and then delivered to the microprocessor 322. Using this feedback information, the microprocessor 322 can determine whether the individual solenoids 22A–22H (not shown) and their associated transmission solenoid driver circuits are functioning properly. However, as noted above, the A/D converter 348 still must digitize the analog signals on lines 370 and 372 for delivery via data bus 362 to the microprocessor 322 for analysis.

The skip shift control circuit 331 includes circuit protection including a parallel arrangement of capacitor 333, resistor 335, zenor diode 337 and varistor 339. The protection circuit is supplied by vehicle system voltage Vss at nominally 13.7 volts DC, whereby activation of the skip shift pressure sensitive button 31 causes voltage Vss to form the signal to A/D converter 348 for digitization and input to microcomputer 322.

The power supply circuit 338 receives a supply voltage Vbb applied across ground line 386 and line 388, and produces a coarsely filtered supply voltage Vbbf to the low voltage detector circuit 344. The power supply 332 also produces heavily regulated Vcc signal (nominally +5 volts DC) on line 392 which supplies power to all the circuits or modules 334–354. The remainder of the controller 30 circuits operate and interact in similar fashion as disclosed in U.S. Pat. No. 4,855,913 to Brekkestran et al., entitled "Electronic Control System for Powershift Transmission"

Software

Figure 7:
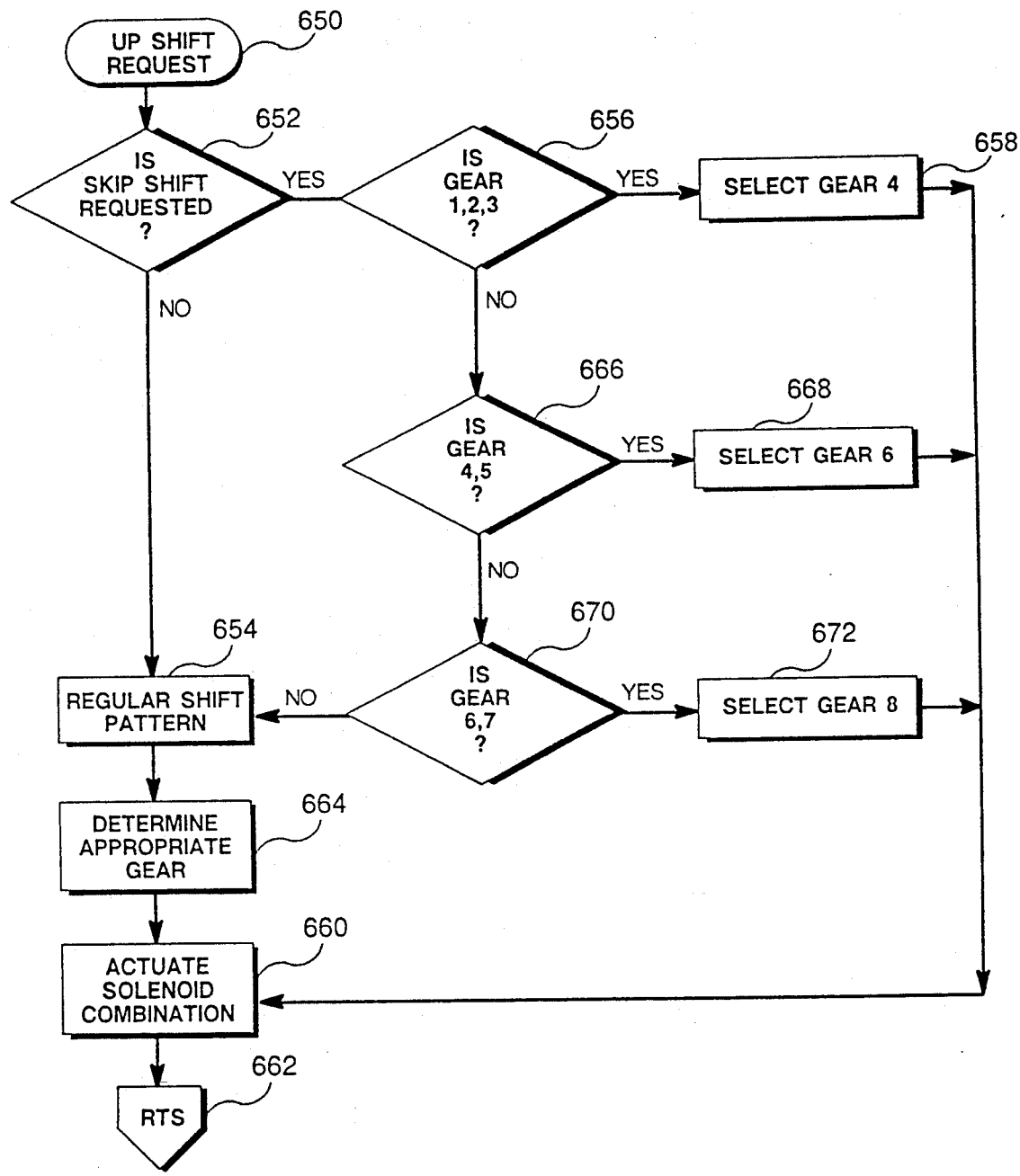
FIG. 7 is a generalized flowchart showing the organization of the software used with the electronic system of the present invention.

As disclosed in U.S. Pat. No. 4,425,620 to Batcheller et al., entitled "Electrical Control for Power Shift Transmission", and U.S. Pat. No. 4,855,913 to Brekkestran et al., entitled "Electronic Control System for Powershift Transmission", the controller 30 runs under control of a stored program placed in a ROM module 58 or 330, respectively. It will be understood that other equivalent means such as logic circuitry may be used to implement the functions performed under the stored program in the illustrated embodiments. The features of the stored program important to an understanding of the present invention will now be explained with reference to FIG. 7. FIG. 7 is a flowchart showing a subroutine for performance of either a normal shift procedure or a special skip shift procedure, performed by the microprocessor 56 or the microprocessor 322, respectively, under control of the stored program. Upon receiving a shift request as indicated by oval block 650, microprocessor 56 or 322, respectively, determines whether the vehicle operator has requested a skip shift as indicated by decision block 652. If the input indicates a negative response, the microprocessor 56 or 322, respectively, continues to block 654, where the normal shift pattern is accessed. The program then instructs the microprocessor 56 or 322, respectively, to determine the appropriate solenoids in block 664 and to actuate the appropriate solenoids in block 660 prior to proceeding to block 662 for instruction to return to the main program. However, if the input indicates that the vehicle operator has requested a skip shift, the microprocessor 56 or 322, respectively, will proceed to decision block 656 to initiate the skip shift upshift sequence. If the decision block 656 indicates that the transmission clutch solenoids 22A-22H corresponding to gears 1, 2, or 3 are actuated, the microprocessor 56 or 322, respectively, is instructed to select the clutch solenoid combination 22A-22H corresponding to gear 4 in block 658. This selection is then transferred to block 660, where the appropriate solenoids 22A-22H are actuated. The program continues to block 662, where the stored program is instructed to return to the main program to await further input regarding gear ratio selection.

If the decision block 656 indicates a negative response, the program proceeds to decision block 666 to determine if gears 4 or 5 are currently engaged. If a positive response is obtained, the program continues to block 668 for the selection of gear 6 and further proceeds to blocks 660 and 662, as noted above. Should the decision block 666 indicate a negative response, the program continues to the decision block 670 to determine if gears 6 or 7 are engaged. As above, a positive response will direct the program to block 672 for selection of gear 8 and further to blocks 660 and 662. A negative response from the decision block 670 indicates that the gear ratios appropriate for the skip shift function are exceeded and that further skip shifting is inappropriate. Accordingly, the program is directed to the block 654 for normal gear ratio progression. Thus, selection by the vehicle operator of a skip shift at an inappropriate gear ratio becomes totally ineffective and results in normal gear ratio progression. Further, as the program is repeatedly cycled, the delay circuit described above allows the continuous selection by the vehicle operator of the skip shift function while maintaining the upshift/downshift lever 37 in the upshift position so as to rapidly progress through lower gears 1-4-6-8.

Combination Operator Control

Figure 8:
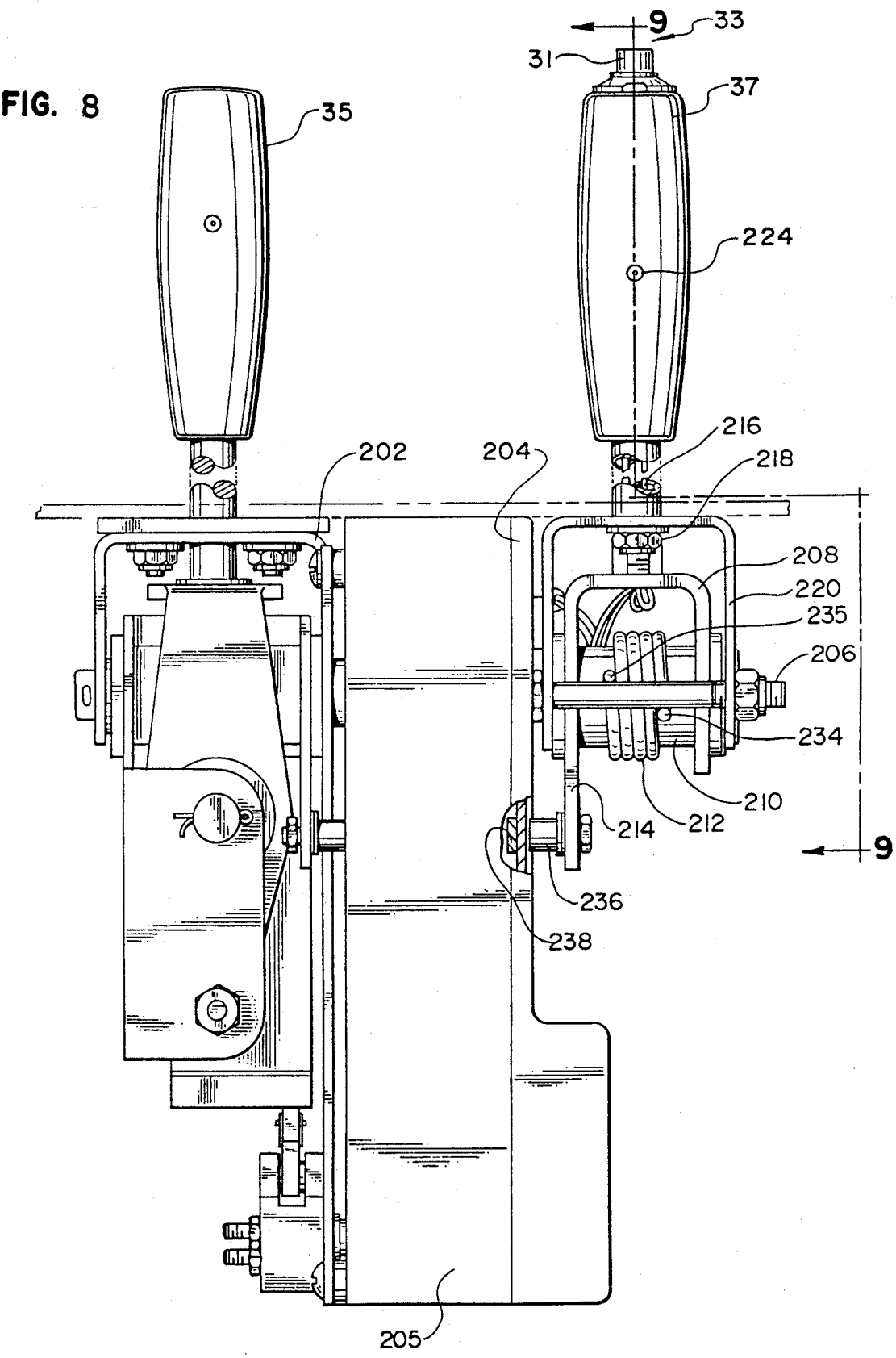
FIG. 8 is a view looking downwardly and rearwardly from a position in front of a vehicle operator and providing plan views of a combination pulser and skip shift control unit and a mode control unit of the systems of FIGS. 2 and 3.
Figure 9:
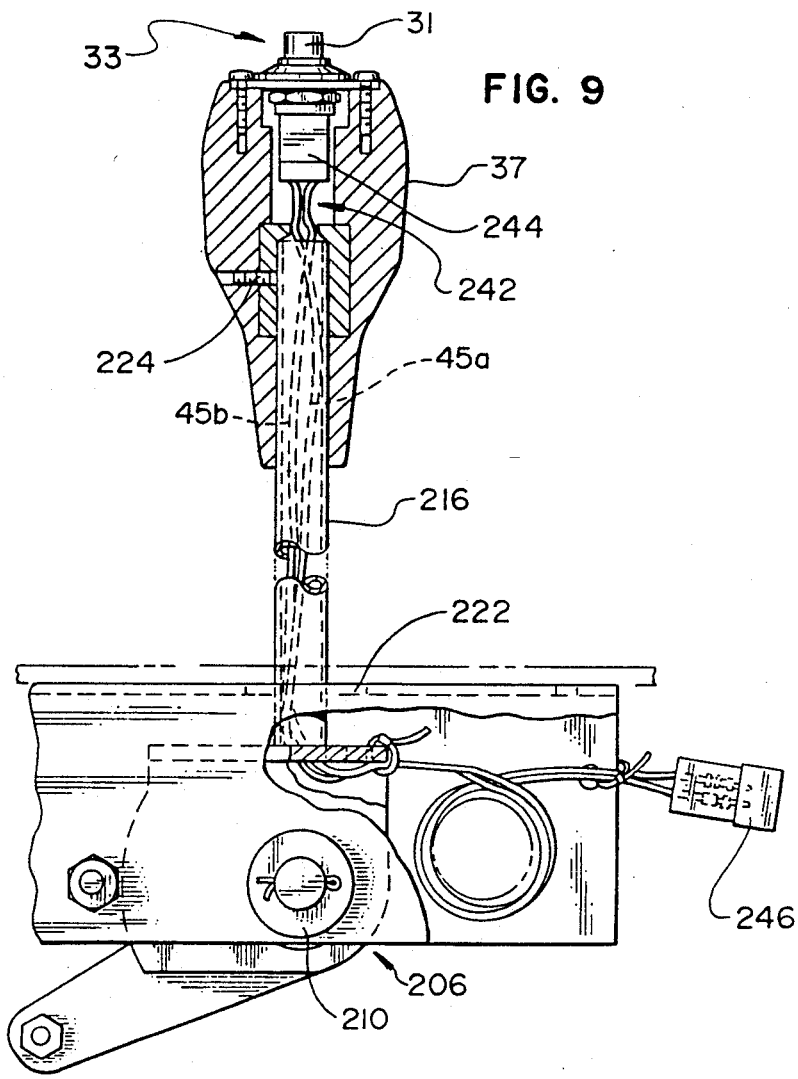
FIG. 9 is a combination plan and sectional view of the pulser and skip shift control unit taken substantially along line 9—9 of FIG. 8.
Figure 10:
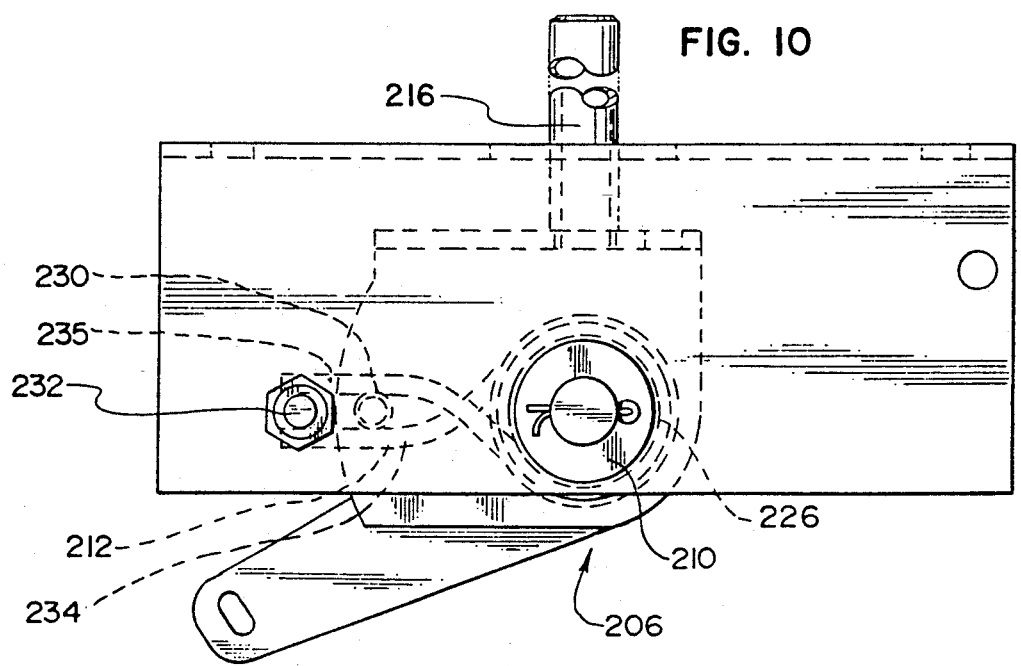
FIG. 10 is a combination plan and sectional view of the pulser and ship shift control unit also taken substantially along line 9—9 of FIG. 8, showing the return spring mechanism in greater detail.

FIGS. 8, 9, and 10 illustrate the combination mode control 35, upshift/downshift control 36, and skip shift control 33. As shown in FIG. 8, the mode control lever 35 is mounted to bracket assembly 202. The pulser lever 37 is mounted to bracket assembly 204. Located between bracket assemblies 202 and 204 is electronic module 205, which includes all sensors necessary to the function of both mode control lever 35 and pulser lever 37.

Mode control 35, although mounted in combination with the upshift/downshift control 36 and the skip shift control 33, is identical in function to the mode control 35 as described in U.S. Pat. No. 4,425,620 to Batcheller, et al., entitled "Electrical Control for Power Shift Transmission". Attention is invited to this reference for further details on the mode control 35.

The upshift/downshift control 36, however, has been altered to provide the additional function of the skip shift control 33.

As shown in FIGS. 8, 9, and 10, the pulser lever 37 is rotatably supported by gimbal assembly 206 mounted to bracket assembly 204. Lever 37 includes yolk 208, bushing 210, centering torsion spring 212, sensor arm 214, hollow shaft 216, and skip shift control 33. Bracket assembly 204 includes supporting collar 220 provided with aperture 222.

Lever 37, attached to hollow shaft 216 via set screw 224, is located within aperture 222 of supporting collar 220 and threadingly attached to yolk 208. Yolk 208, which is provided with apertures 226 for receiving bushing 210, is restrained by coddler pin 228 and is rotatable about bushing 210.

Lever 37, hollow shaft 216 and yolk 288 are urged to a center position via centering torsion spring 212. Yolk 208 is further provided with pin 230 located proximate and parallel to bushing 210. Similarly, supporting collar 220 is provided with pin 232. Tangs 234, 235 of the spring 212 engage opposite surfaces of the pins 230 and 232, said that as yolk 208 is rotated about pivot 210, the tangs 234 are caused to separate. As the resiliency of the tangs 234, 235 against pins 230 and 232 tend to urge the yolk 208 back to the center position, the lever 37 is thus urged to the center position.

Mounted on sensor arm 214 is actuator 236. Reed proximity switches 238 and 240 (hidden behind switch 258 in FIG. 8) are located within electronic module 205. When lever 37 is moved to the downshift position, actuator 236 is brought into proximity with Reed switch 238, which provides the downshift DN signal to display driver/shift input circuit 64.

Similarly, when lever 37 is moved to the upshift position, actuator 236 is brought into proximity with Reed switch 240. This results in an upshift UP signal which is supplied to display driver/shift input circuit 64. As long as lever 37 remains in the upshift position or the downshift position, actuator 236 remains in proximity of switch 238 or 240, respectively, and the upshift UP or downshift DN signal continues to be provided.

The upshift/downshift control 36 also provides a failsafe forward and failsafe reverse feature, which permit operation of the vehicle in an emergency, even if the controller 30 fails or malfunctions, in a similar manner to that disclosed in the references cited herein.

The skip shift control 33 is shown in FIGS. 8 and 9 is located at the distal end of lever 37. Pressure sensitive button 31, urged by well known resilient means to the fully extended position, is located in an axial cavity 242 provided in lever 37 and is activated by thumb pressure exerted by the vehicle operator. Button 31 is then positioned to selectively close switch 244, which terminates lines 45a and 45b, to send either digital or analog signal to controller 30 as discussed above. Lines 45a and 45b extend through hollow shaft 216 and through yolk 208 to harness connection 246.

Remaining Circuits

Shown in FIG. 4 is transmission solenoid driver circuit 66, display 50, throttle control 38, clutch pedal 48 and miscellaneous safety features. As a complete description of these systems is provided in the aforementioned reference, U.S. Pat. No. 4,425,620 to Batcheller et al., entitled "Electrical Control for Power Shift Transmission", the reader to directed thereto for a full description and details of operation.

Alternative Embodiments

Although the preferred embodiments have been described, other embodiments have been considered as potentially useful in executing the concept of the present invention. For example, it is entirely possible to locate the skip shift control 33 on a floor mounted assembly to allow the vehicle operator to actuate the skip shift control 33 by foot.

Further, the skip shift programing placed in the stored program of the microprocessor 322 may be modified to allow downshifting, instead of only upshifting, as is currently the preferred method.

Finally, as additional reverse gears are added to the system, it is possible to further modify the stored program to allow the skip shift feature to function while the mode select lever 35 is in the (R) position. Thus, the advantages brought by the current system could be expanded to improve the acceleration characteristics of the vehicle via engaging only selected, instead of sequentially all, the reverse gear ratios.

The preferred embodiments of the present invention have been described, however, it is not intended to limit the spirit and scope of the invention. It will be understood that various changes in the details, arrangements and configuration of the parts which have been described and illustrated above in order to explain the nature of the present invention may be made by those skilled in the art within the principle and scope of the present invention as expressed in the appended claims.

What is claimed is:

1. A system for controlling an operator-shifted vehicular transmission having a single shift pattern, the pattern having a plurality of forward drive gear ratios in a single sequential progression of ratios, the system including:
   a plurality of predetermined transmission ratios within the progression, such ratios being denominated as "skip ratios," any one of which is available to be skipped by the operator during transmission shifting;
   an operator-actuated lever for upshifting the transmission through the progression;
   switching means manually operated independent of vehicle speed and substantially simultaneous with lever-controlled transmission upshifting to skip at least one skip ratio in the progression;
and wherein:
   the system includes means to select one of (a) a mode for manually operating the transmission and (b) a mode for automatically operating the transmission; and, the switching means operates only in the manual mode.

2. The system of claim 1 wherein each of the ratios is identified by a number and a ratio is skipped as the transmission is shifted from a lower-numbered ratio toward a higher-numbered ratio.

3. The system of claim 2 wherein a ratio is skipped as the transmission is shifted from a higher-numbered ratio toward a lower-numbered ratio.

4. The system of claim 3 further including a plurality of reverse gear ratios in a sequentially numbered progression and a reverse gear ratio is skipped as the transmission is shifted between a lower-numbered reverse ratio and a higher-numbered reverse ratio.

5. The system of claim 1 wherein the switching means is operable to skip at least three ratios in the progression, at least two of such three ratios being non-sequential.

6. The system of claim 5 wherein the switching means is operable to skip four ratios in the progression, three of which are non-sequential.

7. The system of claim 1 wherein a gear ratio is skipped when the lever and the switching means are simultaneously actuated.

8. The system of claim 7 wherein transmission shifting is by manually moving the lever from an intermediate position to a shift position and the lever shifts the transmission by one gear ratio when the lever is momentarily moved to a shift position in the absence of switching means actuation.

9. The system of claim 7 wherein each of all forward drive gear ratios is identified by a different number and a gear ratio is skipped only when (a) the lever is momentarily moved to select a gear ratio corresponding to a skip ratio and (b) the switching means is actuated.

10. The system of claim 7 wherein each of all forward drive gear ratios is identified by a different number and a gear ratio is skipped when (a) the lever is maintained in the shift position and (b) the switching means is maintained actuated.

11. The system of claim 7 wherein each of all forward drive ratios is identified by a different number and all skip ratios are skipped when (a) the lever is maintained in the shift position and (b) the switching means is maintained actuated.

* * * * *